United States Patent
Natanzon

(10) Patent No.: US 9,256,605 B1
(45) Date of Patent: Feb. 9, 2016

(54) READING AND WRITING TO AN UNEXPOSED DEVICE

(75) Inventor: Assaf Natanzon, Tel Aviv (IL)

(73) Assignees: EMC Corporation, Hopkinton, MA (US); EMC International Company, Hamilton (BM)

( * ) Notice: Subject to any disclaimer, the term of this patent is extended or adjusted under 35 U.S.C. 154(b) by 0 days.

(21) Appl. No.: 13/196,993

(22) Filed: Aug. 3, 2011

(51) Int. Cl.
*G06F 17/30* (2006.01)

(52) U.S. Cl.
CPC .............. *G06F 17/30079* (2013.01)

(58) Field of Classification Search
CPC ............................... G06F 17/30079
USPC ....................................... 707/634
See application file for complete search history.

(56) References Cited

U.S. PATENT DOCUMENTS

| | | | |
|---|---|---|---|
| 5,170,480 A | 12/1992 | Mohan et al. | |
| 5,388,254 A | 2/1995 | Betz et al. | |
| 5,499,367 A | 3/1996 | Bamford et al. | |
| 5,864,837 A | 1/1999 | Maimone | |
| 5,879,459 A | 3/1999 | Gadgil et al. | |
| 5,990,899 A | 11/1999 | Whitten | |
| 6,042,652 A | 3/2000 | Hyun et al. | |
| 6,065,018 A | 5/2000 | Beier et al. | |
| 6,143,659 A | 11/2000 | Leem | |
| 6,148,340 A | 11/2000 | Bittinger et al. | |
| 6,174,377 B1 | 1/2001 | Doering et al. | |
| 6,174,809 B1 | 1/2001 | Kang et al. | |
| 6,203,613 B1 | 3/2001 | Gates et al. | |
| 6,260,125 B1 | 7/2001 | McDowell | |
| 6,270,572 B1 | 8/2001 | Kim et al. | |
| 6,272,534 B1 | 8/2001 | Guha | |
| 6,287,965 B1 | 9/2001 | Kang et al. | |
| 6,467,023 B1 | 10/2002 | DeKoning et al. | |
| 6,574,657 B1 | 6/2003 | Dickinson | |
| 6,621,493 B1 | 9/2003 | Whitten | |
| 6,804,676 B1 | 10/2004 | Bains, II | |
| 6,947,981 B2 | 9/2005 | Lubbers et al. | |
| 7,043,610 B2 | 5/2006 | Horn et al. | |
| 7,076,620 B2 | 7/2006 | Takeda et al. | |
| 7,111,197 B2 | 9/2006 | Kingsbury et al. | |
| 7,117,327 B2 | 10/2006 | Hirakawa et al. | |

(Continued)

FOREIGN PATENT DOCUMENTS

| | | |
|---|---|---|
| EP | 1154356 | 11/2001 |
| WO | WO 00 45581 A3 | 8/2000 |

OTHER PUBLICATIONS

Microsoft Computer Dictionary, 2002 Press Fifth Edition, p. 58.

(Continued)

*Primary Examiner* — James Trujillo
*Assistant Examiner* — Kurt Mueller
(74) *Attorney, Agent, or Firm* — Daly, Crowley, Mofford & Durkee, LLP

(57) ABSTRACT

In one aspect, a method includes replicating a storage entity which is not accessible though a storage area network by using a data protection appliance (DPA) coupled to a storage area network and a data protection agent installed on a host which can access the storage entity.

In another aspect, a non-transitory machine-readable medium stores executable instructions. The instructions cause a machine to replicate a storage entity which is not accessible though a storage area network by using a data protection appliance (DPA) coupled to a storage area network and a data protection agent installed on a host which can access the storage entity.

21 Claims, 9 Drawing Sheets

(56) References Cited

U.S. PATENT DOCUMENTS

| | | |
|---|---|---|
| 7,120,768 B2 | 10/2006 | Mizuno et al. |
| 7,130,975 B2 | 10/2006 | Suishu et al. |
| 7,139,927 B2 | 11/2006 | Park et al. |
| 7,159,088 B2 | 1/2007 | Hirakawa et al. |
| 7,167,963 B2 | 1/2007 | Hirakawa et al. |
| 7,203,741 B2 | 4/2007 | Marco et al. |
| 7,222,136 B1 | 5/2007 | Brown et al. |
| 7,296,008 B2 | 11/2007 | Passerini et al. |
| 7,328,373 B2 | 2/2008 | Kawamura et al. |
| 7,360,113 B2 | 4/2008 | Anderson et al. |
| 7,426,618 B2 | 9/2008 | Vu et al. |
| 7,516,287 B2 | 4/2009 | Ahal et al. |
| 7,519,625 B2 | 4/2009 | Honami et al. |
| 7,519,628 B1 | 4/2009 | Leverett |
| 7,546,485 B2 | 6/2009 | Cochran et al. |
| 7,577,867 B2 | 8/2009 | Lewin et al. |
| 7,606,940 B2 | 10/2009 | Yamagami |
| 7,627,612 B2 | 12/2009 | Ahal et al. |
| 7,627,687 B2 | 12/2009 | Ahal et al. |
| 7,719,443 B1 | 5/2010 | Natanzon |
| 7,757,057 B2 | 7/2010 | Sangapu et al. |
| 7,774,565 B2 | 8/2010 | Lewin et al. |
| 7,797,357 B1 | 9/2010 | Nagaraj et al. |
| 7,840,536 B1 | 11/2010 | Ahal et al. |
| 7,840,662 B1 | 11/2010 | Natanzon |
| 7,844,856 B1 | 11/2010 | Ahal et al. |
| 7,849,361 B2 | 12/2010 | Ahal et al. |
| 7,860,836 B1 | 12/2010 | Natanzon et al. |
| 7,882,286 B1 | 2/2011 | Natanzon et al. |
| 7,934,262 B1 | 4/2011 | Natanzon et al. |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 | 1/2012 | Natanzon et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 * | 9/2012 | Natanzon et al. ............ 707/660 |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 2002/0129168 A1 | 9/2002 | Kanai et al. |
| 2003/0061537 A1 | 3/2003 | Cha et al. |
| 2003/0110278 A1 | 6/2003 | Anderson |
| 2003/0196147 A1 | 10/2003 | Hirata et al. |
| 2004/0205092 A1 | 10/2004 | Longo et al. |
| 2004/0250032 A1 | 12/2004 | Ji et al. |
| 2004/0254964 A1 | 12/2004 | Kodama et al. |
| 2005/0015663 A1 | 1/2005 | Armangau et al. |
| 2005/0028022 A1 | 2/2005 | Amano |
| 2005/0049924 A1 | 3/2005 | DeBettencourt et al. |
| 2005/0172092 A1 | 8/2005 | Lam et al. |
| 2005/0273655 A1 | 12/2005 | Chow et al. |
| 2006/0031647 A1 | 2/2006 | Hirakawa et al. |
| 2006/0047996 A1 | 3/2006 | Anderson et al. |
| 2006/0064416 A1 | 3/2006 | Sim-Tang |
| 2006/0107007 A1 | 5/2006 | Hirakawa et al. |
| 2006/0117211 A1 | 6/2006 | Matsunami et al. |
| 2006/0161810 A1 | 7/2006 | Bao |
| 2006/0195670 A1 | 8/2006 | Iwamura et al. |
| 2006/0212462 A1 | 9/2006 | Heller et al. |
| 2007/0055833 A1 | 3/2007 | Vu et al. |
| 2007/0180304 A1 | 8/2007 | Kano |
| 2007/0198602 A1 | 8/2007 | Ngo et al. |
| 2007/0198791 A1 | 8/2007 | Iwamura et al. |
| 2007/0220311 A1 * | 9/2007 | Lewin et al. ................. 714/6 |
| 2007/0266053 A1 | 11/2007 | Ahal et al. |
| 2008/0082592 A1 | 4/2008 | Ahal et al. |

OTHER PUBLICATIONS

Soules et al.; "Metadata Efficiency in a Comprehensive Versioning File System", May 2002, CMU-CS-02-145, School of Computer Science, Carnegie Mellon University, Pittsburgh, PA 15213, 33 pages.

Office Action dated Dec. 21, 2011, U.S. Appl. No. 12/045,946, 14 pages.

(56) References Cited

OTHER PUBLICATIONS

Office Action dated Jan. 23, 2012, U.S. Appl. No. 12/818,236, 17 pages.
Gibson, Five Point Plan Lies at the Heart of Compression Technology, Apr. 29, 1991, p. 1.
Soules, Metadata Efficiency in Versioning File Systems, 2003, pp. 1-16.
AIX System Management Concepts: Operating Systems and Devices May 2000, pp. 1-280.
U.S. Appl. No. 12/057,652, filed Mar. 28, 2008.
U.S. Appl. No. 10/512,687, filed Aug. 24, 2005.

* cited by examiner

READING AND WRITING TO AN UNEXPOSED DEVICE

BACKGROUND

Computer data is vital to today's organizations, and a significant part of protection against disasters is focused on data protection. As solid-state memory has advanced to the point where cost of memory has become a relatively insignificant factor, organizations may afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site may recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling roll back of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

In one aspect, a method includes replicating a storage entity which is not accessible though a storage area network by using a data protection appliance (DPA) coupled to a storage area network and a data protection agent installed on a host which can access the storage entity.

In another aspect, a non-transitory machine-readable medium stores executable instructions. The instructions cause a machine to replicate a storage entity which is not accessible though a storage area network by using a data protection appliance (DPA) coupled to a storage area network and a data protection agent installed on a host which can access the storage entity.

In a further aspect, an apparatus includes circuitry to replicate a storage entity which is not accessible though a storage area network by using a data protection appliance (DPA) coupled to a storage area network and a data protection agent installed on a host which can access the storage entity.

DETAILED DESCRIPTION

Figure 1:
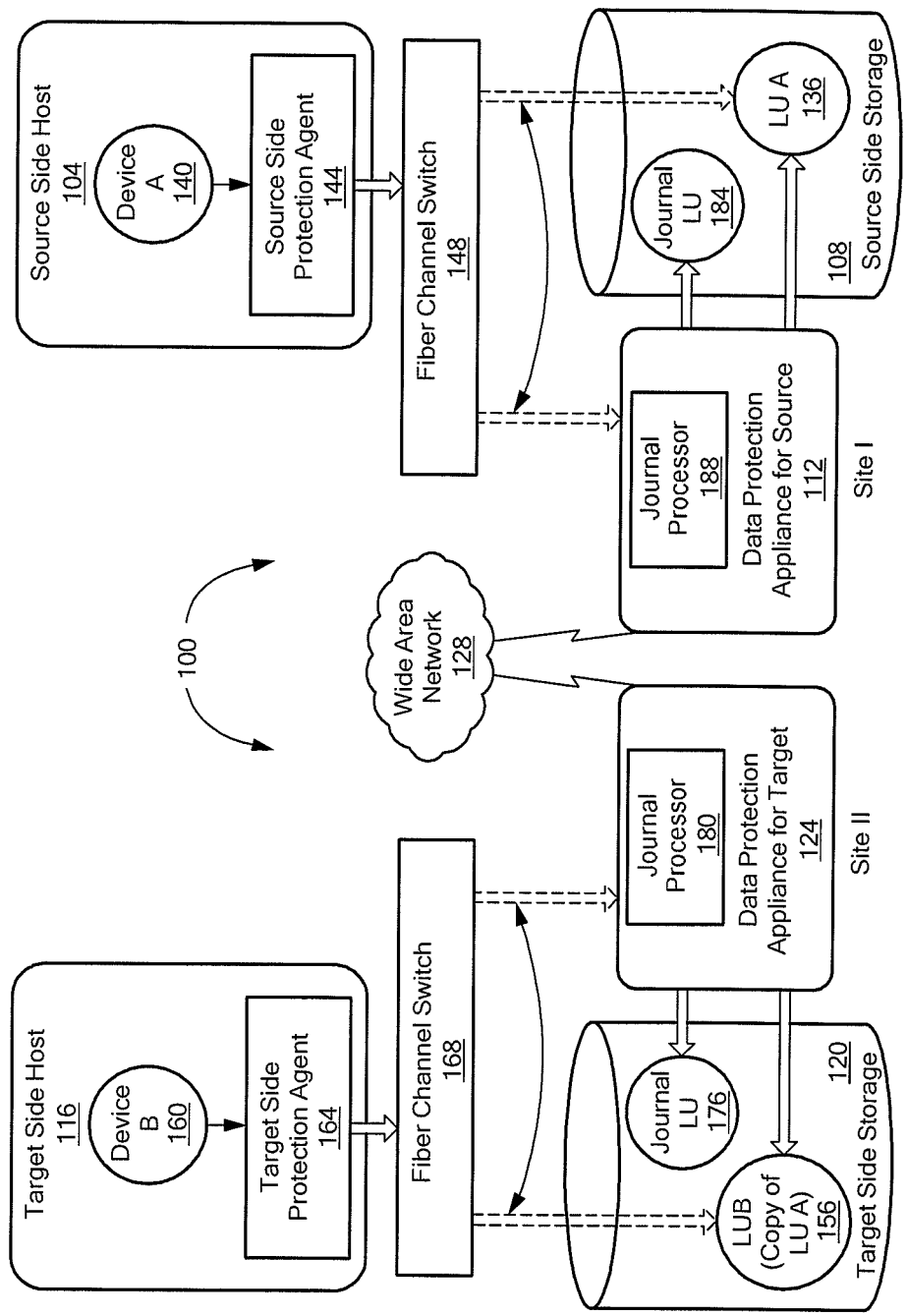
FIG. 1 is a block diagram of an example of a data protection system.

Described herein is an approach to read and write from an unexposed device, for example, as shown in FIGS. 5 to 8B. By reading and writing from an unexposed device, the unexposed device may be replicated.

The following definitions are employed throughout the specification and claims.

BACKUP SITE—may be a facility where replicated production site data is stored; the backup site may be located in a remote site or at the same location as the production site;

CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system;

RPA—may be replication protection appliance, is another name for DPA.

HOST—may be at least one computer or networks of computers that runs at least one data processing application that issues I/O requests to one or more storage systems; a host is an initiator with a SAN;

HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit;

PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system;

SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side;

SNAPSHOT—a Snapshot may refer to differential representations of an image, i.e., the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side;

WAN—may be a wide area network that connects local networks and enables them to communicate with one another, such as the Internet.

SPLITTER/PROTECTION AGENT—may be an agent running either on a production host a switch or a storage array which can intercept IO and split them to a DPA and to the storage array, fail IO redirect IO or do any other manipulation to the IO.

VIRTUAL VOLUME—may be a volume which is exposed to host by a virtualization layer, the virtual volume may be spanned across more than one site DISTRIBUTED MIRROR—may be a mirror of a volume across distance, either metro or geo, which is accessible at all sites.

BLOCK VIRTUALIZATION—may be a layer, which takes backend storage volumes and by slicing concatenation and striping create a new set of volumes, which serve as base volumes or devices in the virtualization layer MARKING ON SPLITTER—may be a mode in a splitter where intercepted IOs are not split to an appliance and the storage, but changes (metadata) are tracked in a list and/or a bitmap and I/O is immediately sent to down the IO stack.

FAIL ALL MODE—may be a mode of a volume in the splitter where all write and read IOs intercepted by the splitter are failed to the host, but other SCSI commands like read capacity are served.

GLOBAL FAIL ALL MODE—may be a mode of a volume in the virtual layer where all write and read IOs virtual layer are failed to the host, but other SCSI commands like read capacity are served.

LOGGED ACCESS—may be an access method provided by the appliance and the splitter, in which the appliance rolls the volumes of the consistency group to the point in time the user requested and let the host access the volumes in a copy on first write base.

VIRTUAL ACCESS—may be an access method provided by the appliance and the splitter, in which the appliance exposes a virtual volume from a specific point in time to the host, the data for the virtual volume is partially stored on the remote copy and partially stored on the journal.

CDP—Continuous Data Protection, may refer to a full replica of a volume or a set of volumes along with a journal which allows any point in time access, the CDP copy is at the same site, and maybe the same storage array of the production site CRR—Continuous Remote Replica may refer to a full replica of a volume or a set of volumes along with a journal which allows any point in time access at a site remote to the production volume and on a separate storage array.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

Description of Examples Using of a Five State Journaling Process

Reference is now made to FIG. 1, which is a simplified illustration of a data protection system 100. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks may be used.

In one example, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In one example, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In one example, storage system 108 exposes a logical unit 136, designated as LU A, and storage system 120 exposes a logical unit 156, designated as LU B.

In one example, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain examples, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers either physical or virtual, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In one example, host device 104 identifies LU A and generates a corresponding host device 140, designated as Device A, through which it can access LU A. Similarly, host computer 116 identifies LU B and generates a corresponding device 160, designated as Device B.

In one example, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer (physical or virtual) that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In one example, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In one example, host computer 104 and host computer 116 include protection agents 144 and 164, respectively. Protection agents 144 and 164 intercept SCSI commands issued by their respective host computers, via host devices to logical units that are accessible to the host computers. In one example, a data protection agent may act on an intercepted SCSI commands issued to a logical unit, in one of the following ways: Send the SCSI commands to its intended logical unit, Redirect the SCSI command to another logical unit, Split the SCSI command by sending it first to the respective DPA, After the DPA returns an acknowledgement, send the SCSI command to its intended logical unit, Fail a SCSI command by returning an error return code and Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In one example, protection agents communicate with their respective DPAs by sending SCSI commands over fiber channel.

In one example, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In one example, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in one example, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In one example, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A to 3D, journal entries include four streams, two of which are written when write transaction are entered into the journal, and two of which are written when write transaction are applied and removed from the journal.

Figure 2:
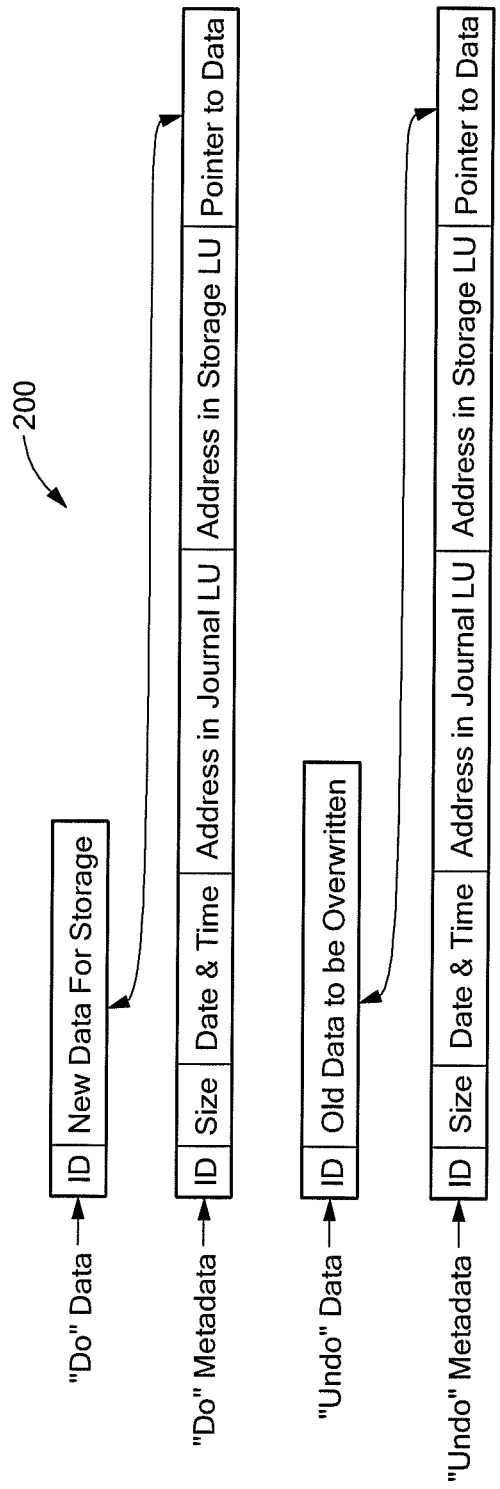
FIG. 2 is an illustration of an example of a journal history of write transactions for a storage system.

Reference is now made to FIG. 2, which is a simplified illustration of a write transaction 200 for a journal, in one example. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Image Access

Herein, some information is provided for conventional continuous data protection systems having journaling and a replication splitter which may be used in one or more embodiments is provided. A replication may set refer to an association created between the source volume and the local and/or remote target volumes, and a consistency group contains one or more replication sets. A snapshot may be the difference between one consistent image of stored data and the next. The exact time for closing the snapshot may determined dynamically depending on replication policies and the journal of the consistency group.

In synchronous replication, each write may be a snapshot. When the snapshot is distributed to a replica, it may be stored in the journal volume, so that is it possible to revert to previous images by using the stored snapshots. As noted above, a splitter mirrors may write from an application server to LUNs being protected by the data protection appliance. When a write is requested from the application server it may be split and sent to the appliance using a host splitter/driver (residing in the I/O stack, below any file system and volume manager, and just above any multipath driver (such as EMC POWER-PATH®, for example), through an intelligent fabric switch, through array-based splitter, such as EMC CLARIION®, for example.

There may be a number of image access modes. Image access may be used to restore production from the disaster recovery site, and to roll back to a previous state of the data. Image access may be also to temporarily operate systems from a replicated copy while maintenance work is carried out on the production site and to fail over to the replica. When image access is enabled, host applications at the copy site may be able to access the replica.

In virtual access, the system may create the image selected in a separate virtual LUN within the data protection appliance. While performance may be constrained by the appliance, access to the point-in-time image may be nearly instantaneous. The image may be used in the same way as logged access (physical), noting that data changes are temporary and stored in the local journal. Generally, this type of image access is chosen because the user may not be sure which image, or point in time is needed. The user may access several images to conduct forensics and determine which replica is required. Note that in known systems, one cannot recover the production site from a virtual image since the virtual image is temporary. Generally, when analysis on the virtual image is completed, the choice is made to disable image access.

If it is determined the image should be maintained, then access may be changed to logged access using 'roll to image.' When image access is disabled, the virtual LUN and all writes to it may be discarded.

In an embodiment of virtual access with roll image in background, the system first creates the image in a virtual volume managed by the data protection appliance to provide rapid access to the image, the same as in virtual access. Simultaneously in background, the system may roll to the physical image. Once the system has completed this action, the virtual volume may be discarded, and the physical volume may take its place. At this point, the system continues to function as if logged image access was initially selected. The switch from virtual to physical may be transparent to the servers and applications and the user may not see any difference in access. Once this occurs, changes may be read from the physical volume instead of being performed by the appliance. If image access is disabled, the writes to the volume while image access was enabled may be rolled back (undone). Then distribution to storage may continue from the accessed image forward.

In some embodiments in physical logged access, the system rolls backward (or forward) to the selected snapshot (point in time). There may be a delay while the successive snapshots are applied to the replica image to create the selected image. The length of delay may depend on how far the selected snapshot is from the snapshot currently being distributed to storage. Once the access is enabled, hosts may read data directly from the volume and writes may be handled through the DPA. The host may read the undo data of the write and the appliance may store the undo data in a logged access journal. During logged access the distribution of snapshots from the journal to storage may be paused. When image access is disabled, writes to the volume while image access was enabled (tracked in the logged access journal) may be rolled back (undone). Then distribution to storage may continue from the accessed snapshot forward.

Disable image access may mean changes to the replica may be discarded or thrown away. It may not matter what type of access was initiated, that is, logged or another type, or whether the image chosen was the latest or an image back in time. Disable image access effectively says the work done at the disaster recovery site is no longer needed.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g., DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

Splitting IOs

Figure 3:
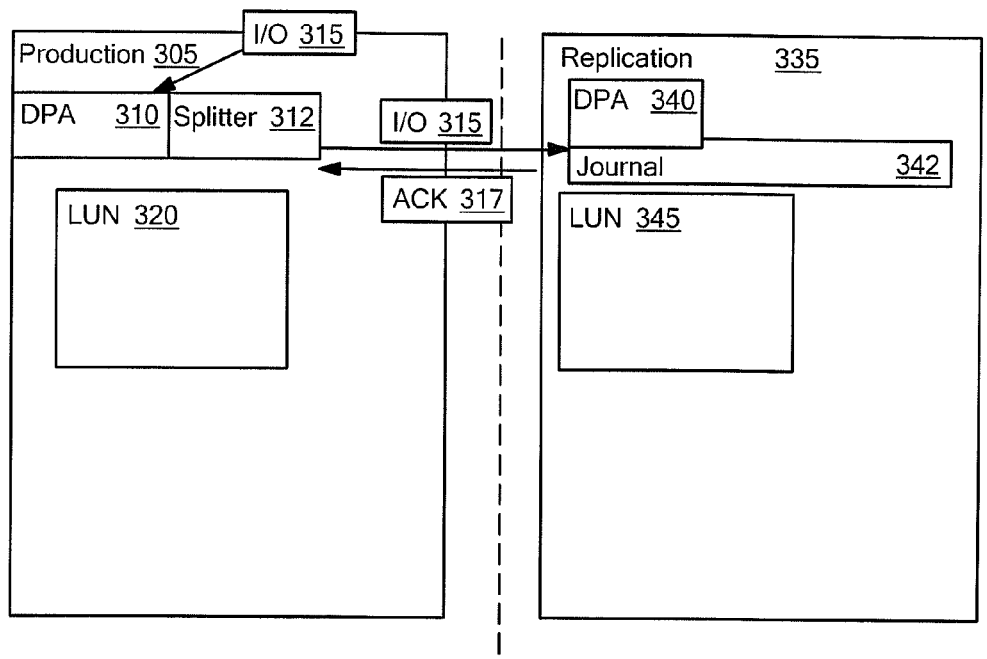
FIG. 3 is a block diagram of a production and replication appliance.
Figure 4:
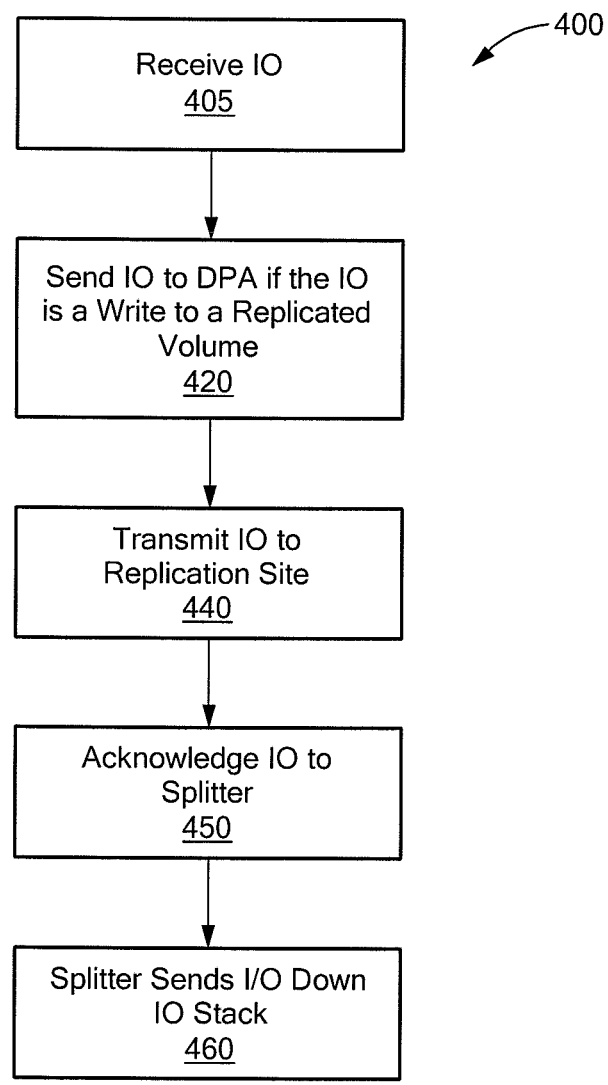
FIG. 4 is an example of a flowchart to split IOs.

Refer now to FIGS. 3 and 4 which illustrate how IOs may be split at a production site 305, replicated, and sent to a replication site 335. An IO 315 is received at splitter 312 (e.g., a data protection agent 144) on the production site 305 (processing block 405). If the IO 315 is a write to a volume being replicated, splitter 312 sends IO 315 to a special device exposed by DPA 310 (processing block 420). DPA 310 transmits the IO 315 to the replication site 335 (processing block 440). The DPA 310 acknowledges 317 the IO 315 to the splitter 312 (processing block 450). In one example, acknowledgements by the DPA 310 may be independent of sending the IO to the replica site in asynchronous replication or waiting for the transmission of the IO to the replica site to complete in synchronous replication. The splitter 312 sends IO 315 down the IO stack (processing block 460).

In most examples, the replication site 335 may have the changes applied to the production site 305 stored in a journal 342 on the replication site 335.

Reading and Writing from an Unexposed Device

Figure 5:
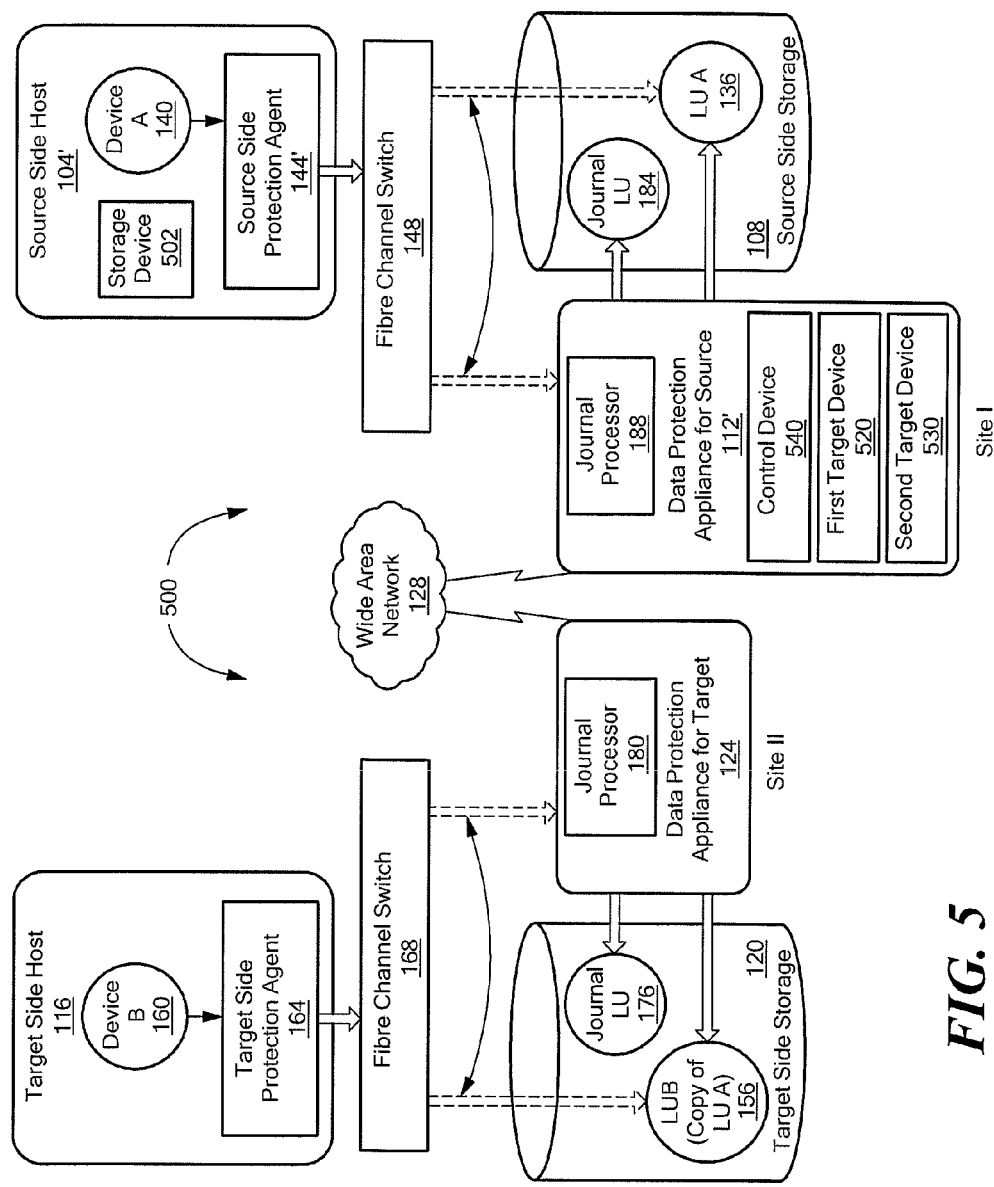
FIG. 5 is a block diagram of another example of a data protection system to read and write to an unexposed device.

Referring to FIG. 5, an example of a data protection system that may be used to handle unexposed devices is a data protection system 500. The data protection system 500 includes the same components as the data protection system 100 except that the host 104 has been replaced by a host 104' and the DPA 112 has been replaced by a DPA 112'.

The DPA 112' is the same at the DPA 112 except as explained herein the DPA 112' is modified to allow replication of the data stored at the storage device 502 by DPA 112'. The host 104' includes the same components as the host 104 except the host 104' includes a storage device 502, which is not exposed to the DPA 112', and a data protection agent 144'.

The DPA 112' also exposes a first target device 520, a second target device 530 and a control device 540. The first and second target devices 520, 530 are not physical devices but virtual devices that are created and exposed by the DPA 112'. For example, the first and second target devices 520 and 530 are created and exposed when a user configures the system 500 to replicate device 502. If the user wants to replicate another internal device (i.e., not exposed to the DPA 112'), two more target devices would be created. In one example, there is only one control device 540 no matter how many internal devices are being replicated so that the data protection agent 144' (and other protection agents running on separate hosts) will send the read requests to just one control device 540.

The first target device 520 is used as target for the IOs sent by the data protection agent 144'. When the data protection agent 144' intercepts a write command (write IO) to the storage device 502 the data protection agent 144' will first send the write IO to the first target device 520 exposed by DPA 112'. After the DPA 112' acknowledges the IO, the data protection agent 144' will send the write IO to the storage device 502.

The data protection agent 144' is the same at the data protection agent 144 except as explained herein the data protection agent 144' may be modified to allow replication of the data stored at the storage device 502 by the DPA 112'. As used herein the data protection agent 144' is also known as a splitter. In other examples, the data protection agent 144' may run on a host storage, fabric channel or any other location in the data path.

A user may desire to replicate the storage device 502 which is internal to the host 104', but is not exposed by the fiber channel switch 148. Thus, a DPA 112' cannot replicate the storage device 502 since the DPA 112' cannot see the storage device 502.

In one example, the storage device 502 may be an internal drive in the host 104' or any other device which is accessible by the host 104' but cannot be accessed by the DPA 112'.

Thus, any device at the host 104' is considered to be unexposed or invisible to the DPA 112'.

In one advantage, an ability to replicate internal devices like an internal hard drive and to group several internal hard drives from several devices as one consistency group (since all IOs arrive in the correct order to the DPA) allows replication of distributed data (e.g., EMC GREENPLUM DATABASE®). In another advantage, the ability to replicate internal drives of virtual machines stored for instance on a VMDK (Virtual Machine Disk Format) file on a VMFS (Virtual Machine File System) allows replication at the virtual machine level. In a further advantage, allowing replication of single files, or sets of files in a file system by having the splitter treat a file as a device, the reads/writes to the unexposed storage device can be translated to reads and writes to the file. Other advantages will be apparent to one of ordinary skill in the art based on reading of the specification and claims.

Figure 6:
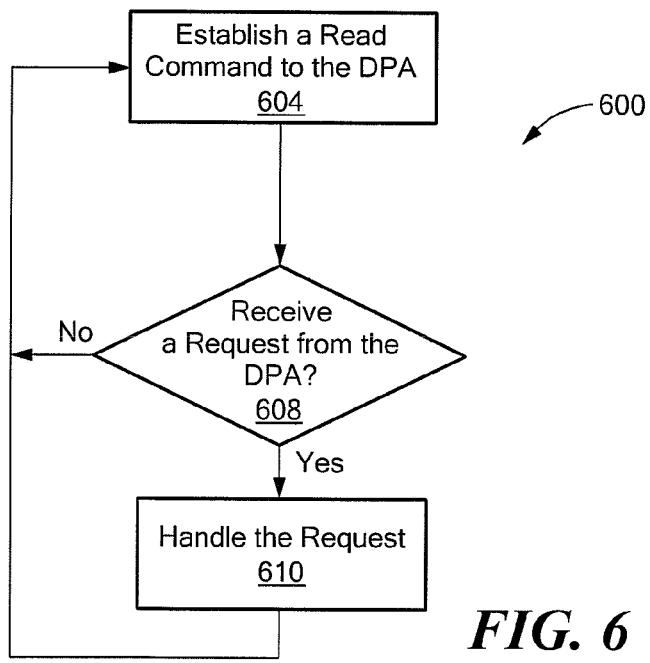
FIG. 6 is a flowchart of an example of a process performed at a data protection agent.
Figure 7:
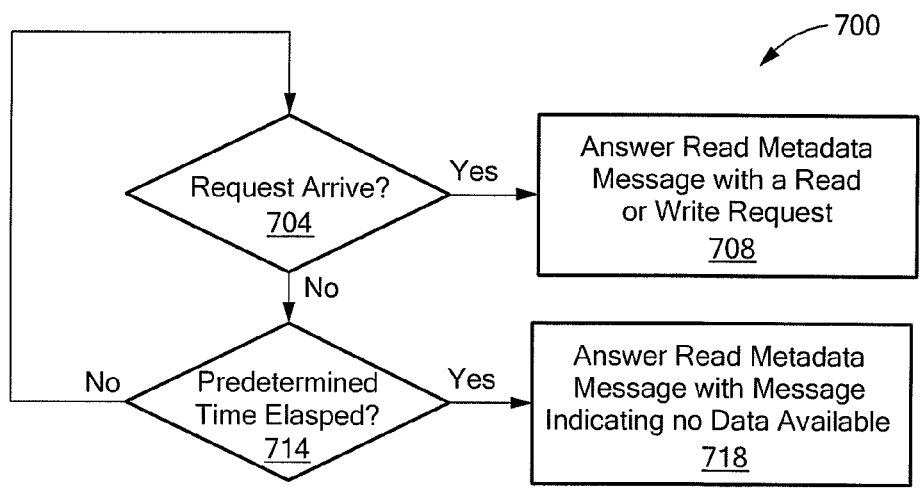
FIG. 7 is a flowchart of an example of a process performed at a data protection appliance.

As will be shown in FIGS. 6 and 7, the host 104' and the DPA 112' each perform separate but interdependent processes that facilitate replication of the unexposed storage device 502.

Referring to FIG. 6, an example of a process performed by the data protection agent 144' is a process 600. The host 104' is connected to DPA 112' through a SCSI interconnect, the DPA 112' exposes an SCSI device and the host 104' is an SCSI initiator.

Figure 8A:
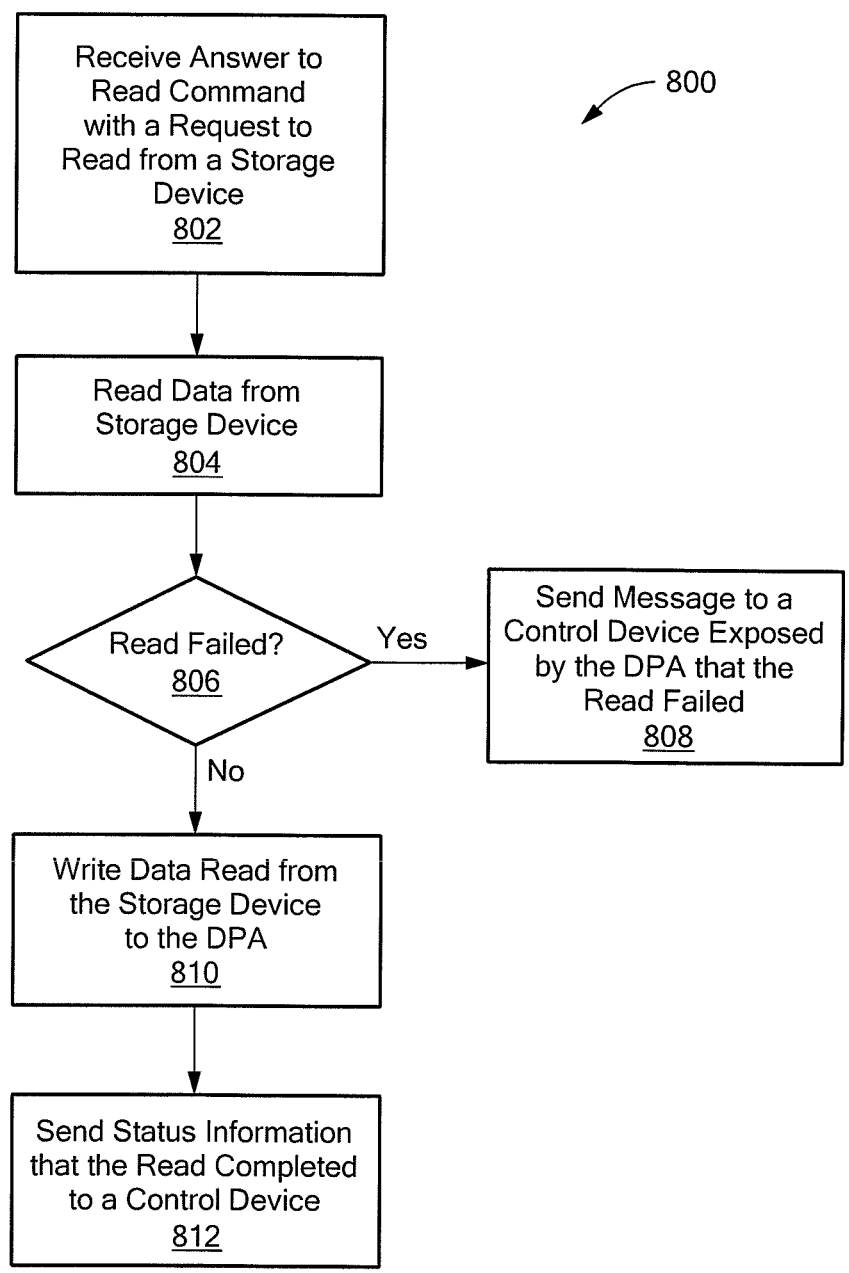
FIG. 8A is a flowchart of an example of a process performed at the data protection agent when a read request is received.
Figures 8B, 9:
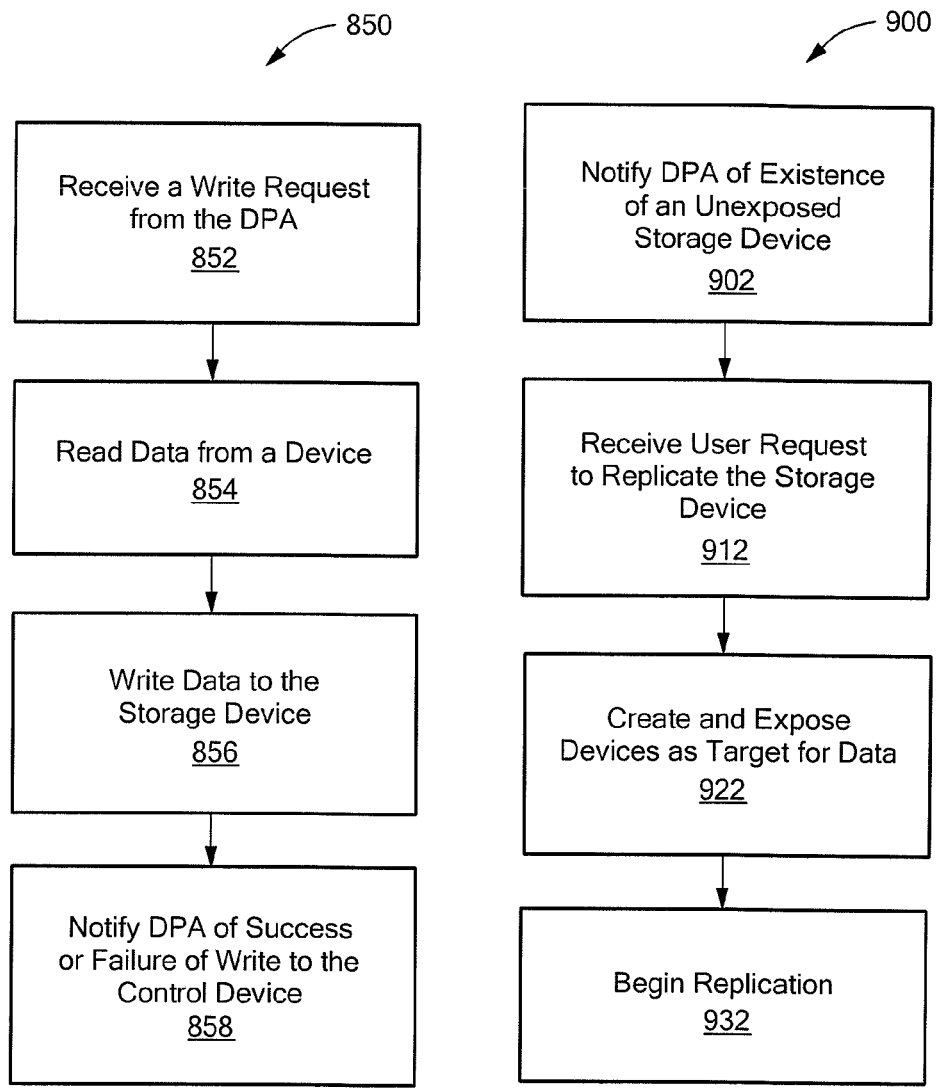
FIG. 8B is a flowchart of an example of a process performed at the data protection agent when a write request is received.
FIG. 9 is a flowchart of an example of a process to perform configuration prior to replication.

Process 600 establishes a read command to the control device 540 of DPA 112' (604). Process 600 determines if requests for read/write to device 502 were received at the DPA 112' (608) and if request was received by the DPA 112', the DPA 112' replies to the read command which arrived from the protection agent with one or more read or write requests (610). Examples of how the requests are handled are shown in FIGS. 8A and 8B.

DPA 112' exposes two devices for each unexposed storage device (e.g., storage device 502), one device, the device 520, which is the target for the IO intercepted by the protection agent 144' and another device, the device 530, which will be the target for the answers of the read/write commands the DPA 112' sends to the storage device 502.

In one example the host 104' uses a protocol to communicate with the DPA 112' to send and retrieve data periodically from the DPA 112' and using the protocol communicates to the DPA 112' that the storage device 502 exists and can be replicated. Since the DPA 112' is a target, the host 104' can send write commands and read commands from the DPA, but since host 104' is only an initiator the DPA 112' cannot initiate commands to the host 104'. The host 104' instead polls DPA commands by reading them from the DPA 112' periodically. The DPA 112' exposes a control device (e.g., a LUN), the control device 540, through which the host 104' can communicate to the DPA 112'.

In order to replicate the storage device 502, DPA 112' must be able to read data from the storage device 502 (and also write data to the storage device 502 when the storage device 502 becomes target of replication after failover). The DPA 112' cannot initiate a read command to the storage device 502 as it is not exposed to the DPA 112'. A protocol exists between the protection agent 144' and the DPA 112' which allows the DPA 112' to read and write data to the storage device 502. The protection agent 144' issues a read command to the control device (LUN) (540) of DPA 112' (604). The read command is used by the DPA 112' to notify the data protection agent 144' which actions the DPA 112' desires to perform. The DPA 112' can do one of the following actions: request a set of reads (FIG. 8A), request a set of writes (FIG. 8B) or do nothing.

FIG. 7 is an example of a process, a process 700, for generic handling of a command from the host 104'. The host 104' sends a SCSI read command to the control device of DPA 112' to read the metadata of the command (704). In one example, the host 104' may send a standard SCSI read command or any vendor specific read type command. For example, the command is send to LUN 0 (the control device 540) exposed by the DPA 112'. The DPA 112' either returns a set of requests (e.g., read or write requests) (708) or returns a do nothing if no requests are available. The data protection agent 144' receives the result of the read command, handles the requests if there are requests, and does nothing otherwise. The host 104' sends a read command again (704), so it can receive new commands. If the DPA 112' does not have any request to send for a period of time (e.g., 1 second) (714), the DPA 112' will answer the read with a no request data (718), so that the host 104' will not need to abort the read.

Once an open read command is answered, the host 104' will immediately issue another read command to allow the DPA 112' to send more requests. The host 104' may issue several read commands (e.g., sixteen read commands) to the DPA 112' to allow IO parallelism, and the DPA 112' may send several requests as an answer to one read command.

Referring to FIG. 8A, an example of a process performed by the data protection agent 144' if the DPA 112' desires to read data from a specific location is a process 800. In this case, the DPA 112' will answer the read command sent by the data protection agent 144' with a read request: Read (device, offset, number of blocks, read ID). The data protection agent 144' will receive the answer to the read command, i.e., it will receive a request to read the required data from the storage device 502 (802). The data protection agent 144' will attempt to read from storage device 502 (804). If the read of the storage device 502 failed (806), the data protection agent 144' sends a message to the control device 540 that the read failed (808). For example, the data protection agent 144' will send a special SCSI vendor specific command to indicate the read failed. If the read from the storage device 502 did not fail (806), the data protection agent 144' write the data it read through a SCSI write command to the device 530 exposed by DPA 112' (810). The data protection agent 144' sends status information that the read completed to the control device 540 (812).

Referring to FIG. 8B, an example of a process performed by the data protection agent 144' if the DPA 112' desires to write data from a specific location is a process 850. The DPA 112' will answer the read command the splitter sent with a write request: Write (device, offset, number of blocks, write ID).

The data protection agent 144' will receive the answer to its read command (processing block 604) in a form of a write request sent by the DPA 112' (852). The data protection agent 144' sends a SCSI read command for the required data (as indicated in the write request) to the second target device 530 exposed by DPA 112' (854). The data protection agent 144' writes the data read from the second device 530 to the storage device 502 (856). The data protection agent 144 sends a message that the write was successful or the write failed (858). For example, a special vendor specific command is sent from the data protection agent 144' to the control device 540 indicating that the write was successful or a failure.

In one example, the data protection agent 144' knows the IDs of the first target device 520, the second target device 530 by using the control protocol through the control device 540. The control device 540 is discovered in the SAN through standard discovery protocols, and exposed to host 104' as LUN 0 of the DPA 112'.

Referring to FIG. 9, an example of a process to configure system 500 to replicate the storage device 502 is a process 900. Process 900 notifies the DPA 112' that an unexposed device is available (902), using, for example, a vendor specific SCSI command to the control device 540. For example, the host 104' notifies the DPA 112' that the storage device 502 is available. Process 800 receives a user request to replicates the storage device 502 (912). The DPA 112' creates and exposes the first and second target devices 520 and 530 as targets for data arriving from the data protection agent 144', and notifies the data protection agent 144' which devices are targets for the storage device 502 (922) and replication begins (932).

Figure 10:
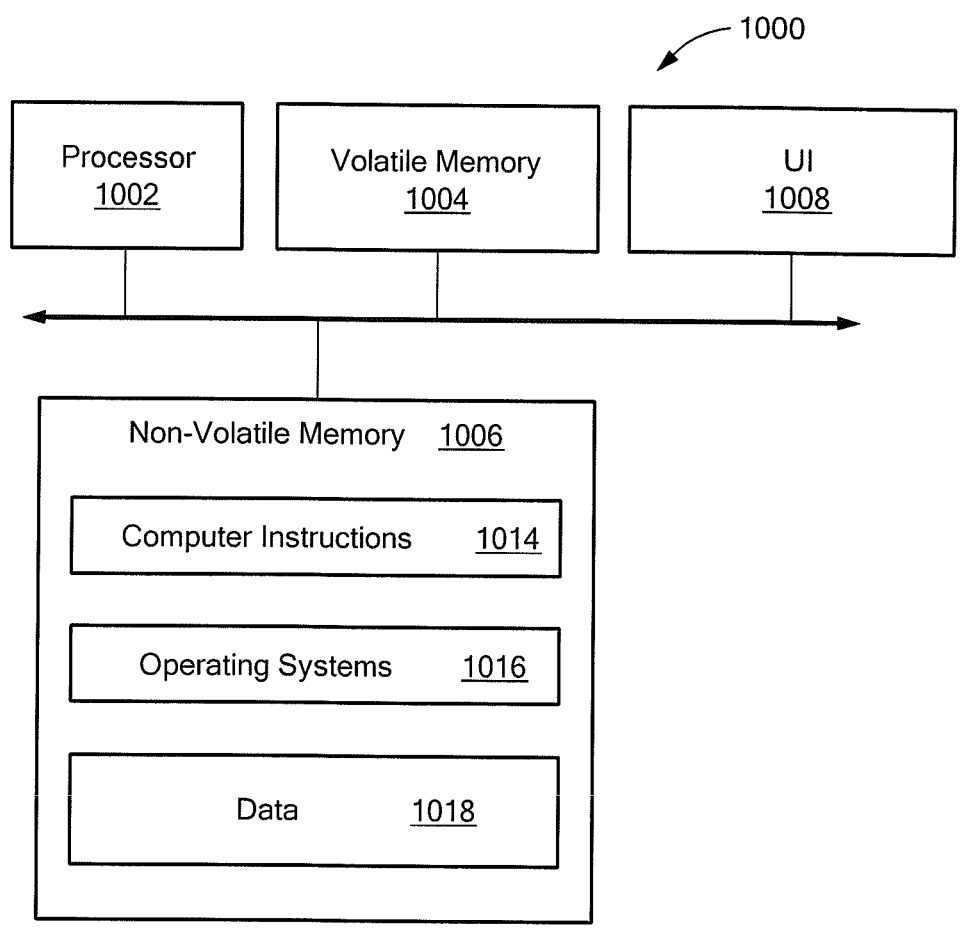
FIG. 10 is a computer on which any of the processes of FIGS. 4, 6, 7, 8A, 8B and 9 may be implemented.

Referring to FIG. 10, a computer 1000 includes a processor 1002, a volatile memory 1004, a non-volatile memory 1006 (e.g., hard disk) and a user interface (UI) 1008 (e.g., a mouse, a keyboard, a display, touch screen and so forth). The non-volatile memory 1006 stores computer instructions 1014, an operating system 1016 and data 1018. In one example, the computer instructions 1014 are executed by the processor 1002 out of volatile memory 1004 to perform all or part of the processes described herein (e.g., processes 400, 600, 700, 800, 850 and 900).

The processes described herein (e.g., 400, 600, 700, 800, 850 and 900) are not limited to use with the hardware and software of FIG. 10; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein. The processes described herein may also be implemented as a machine-readable storage medium, configured with a computer program, where upon execution, instructions in the computer program cause the computer to operate in accordance with the processes.

The processes described herein are not limited to the specific examples described. For example, the processes 400, 600, 700, 800, 850 and 900 are not limited to the specific processing order of FIGS. 4, 6, 7, 8A, 8B and 9 respectively. Rather, any of the processing blocks of FIGS. 4, 6, 7, 8A, 8B and 9 may be re-ordered, combined or removed, performed in parallel or in serial, as necessary, to achieve the results set forth above.

The processing blocks (for example, in processes 400, 600, 700, 800, 850, 850 and 900) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method, comprising:
receiving a request from a user to replicate a storage entity on a host on a source-side of a continuous data protection system;
generating a first target device, a second target device and a control device on a data protection appliance (DPA) on the source-side;
notifying, by the DPA, a data protection agent installed on the host that the first and second target devices are targets for replication of the storage entity;
replicating the storage entity to the first target device using the second target device, the control device and the data protection agent installed on a host which can access the storage entity,
wherein the storage entity is not accessible exposed to the DPA during the replicating, and
wherein the replicating comprises the data protection agent intercepting a write I/O to the storage entity and sending the write I/O to the first target device.

2. The method of claim 1, further comprising notifying the DPA that the storage entity exists.

3. The method of claim 2, further comprising receiving a request from a user to replicate the storage entity.

4. The method of claim 3 wherein replicating the storage entity comprises:
establishing an open read to the DPA by sending a read command;
receiving from the DPA one of a read request or a write request in response to the read command; and
handling the one of the read request or the write request.

5. The method of claim 4 wherein handling one of the read request or the write request comprises:
receiving the read request in response to the read command;
reading data from the storage entity;
writing the data read from the storage entity to the DPA through a write command; and
sending status information that the reading completed to a control device exposed to the DPA.

6. The method of claim 4 wherein handling one of the read request or the write request comprises:
receiving the write request in response to the read command;
reading data from a device exposed by the DPA;
writing the data read from the device exposed by the DPA to the storage entity; and
sending a status of the writing to a control device exposed to the DPA.

7. The method claim 3, wherein replicating the storage entity further comprises:
   exposing a first target device configured to receive IOs from the data protection agent; and
   exposing a second target device configured to receive replies to requests.

8. The method of claim 1 wherein the storage entity is one of an internal storage device or a file.

9. The method of claim 1 wherein the storage entity is a storage device of a virtual machine.

10. The method of claim 1 wherein the storage entity is a file, and
   further comprising treating the file as a storage device unexposed to the DPA.

11. The method of claim 1, further comprising grouping storage devices that are unexposed to the DPA as one consistency group,
   wherein replicating comprises replicating distributed data stored on the storage devices that are unexposed to the DPA.

12. The method of claim 2 wherein the DPA exposes a control device, and
   wherein notification that the storage entity is unexposed is received by a vendor specific SCSI command by the control device.

13. An article comprising:
   a non-transitory machine-readable medium that stores executable instructions, the instructions causing a machine to:
   receive a request from a user to replicate a storage entity on a host on a source-side of a continuous data protection system;
   generate a first target device, a second target device and a control device on a data protection appliance (DPA) on the source-side;
   replicating the storage entity to the first target device using the second target device, the control device and the data protection agent which can access the storage entity;
   notifying, by the DPA, a data protection agent installed on the host that the first and second target devices are targets for replication of the storage entity;
   wherein the storage entity is not accessible exposed to the DPA and the storage area network during the replicating, and
   wherein the instructions to replicate comprises instructions to intercept a write 11O to the storage entity and to send the write I/O to the first target device.

14. The article of claim 13 wherein the instructions causing the machine to replicate the storage entity comprises instructions causing the machine to:
   establish an open read to the DPA by sending a read command;
   receive from the DPA one of a read request or a write request in response to the read command; and
   handle the one of the read request or the write request.

15. The article of claim 14 wherein the instructions causing the machine to handle one of the read request or the write request comprises instructions causing the machine to:
   receive the read request in response to the read command;
   read data from the storage entity;
   write the data read from the storage entity to the DPA through a write command; and
   send status information that the read completed to a control device exposed to the DPA.

16. The article of claim 14 wherein the instructions causing the machine to handle one of the read request or the write request comprises instructions causing the machine to:
   receive the write request in response to the read command;
   read data from a device exposed by the DPA;
   write the data read from the device exposed by the DPA to the storage entity; and
   send a status of the writing to a control device exposed to the DPA.

17. An apparatus, comprising:
   circuitry to:
   receive a request from a user to replicate a storage entity on a host on a source-side of a continuous data protection system;
   generate a first target device, a second target device and a control device on a data protection appliance (DPA) on the source-side;
   replicating storage entity to the first target device using the second target device, the control device and the data protection agent which can access the storage entity;
   notifying, by the DPA, a data protection agent installed on the host that the first and second target devices are targets for replication of the storage entity;
   wherein the storage entity is not accessible to the DPA during the replicating, and
   wherein the circuitry to replicate comprises circuitry to intercept a write I/O to the storage entity and to send the write I/O to the first target device.

18. The apparatus of claim 17 wherein the circuitry comprises at least one of a processor, a memory, programmable logic and logic gates.

19. The apparatus of claim 17 wherein the circuitry to replicate the storage entity comprises circuitry to:
   establish an open read to the DPA by sending a read command;
   receive from the DPA one of a read request or a write request in response to the read command; and
   handle the one of the read request or the write request.

20. The apparatus of claim 17 wherein the circuitry to handle one of the read request or the write request comprises circuitry to:
   receive the read request in response to the read command;
   read data from the storage entity;
   write the data read from the storage entity to the DPA through a write command; and
   send status information that the read completed to the DPA.

21. The apparatus of claim 17 wherein the circuitry to handle one of the read request or the write request comprises circuitry to:
   receive the write request in response to the read command;
   read data from a device exposed by the DPA; and
   write the data read from the device exposed by the DPA to the storage entity and
   send a status of the writing to a control device exposed to the DPA.

* * * * *